May 2, 1939.  C. W. AYERS  2,156,832
ICE CUTTING APPARATUS
Original Filed April 20, 1936  3 Sheets—Sheet 3
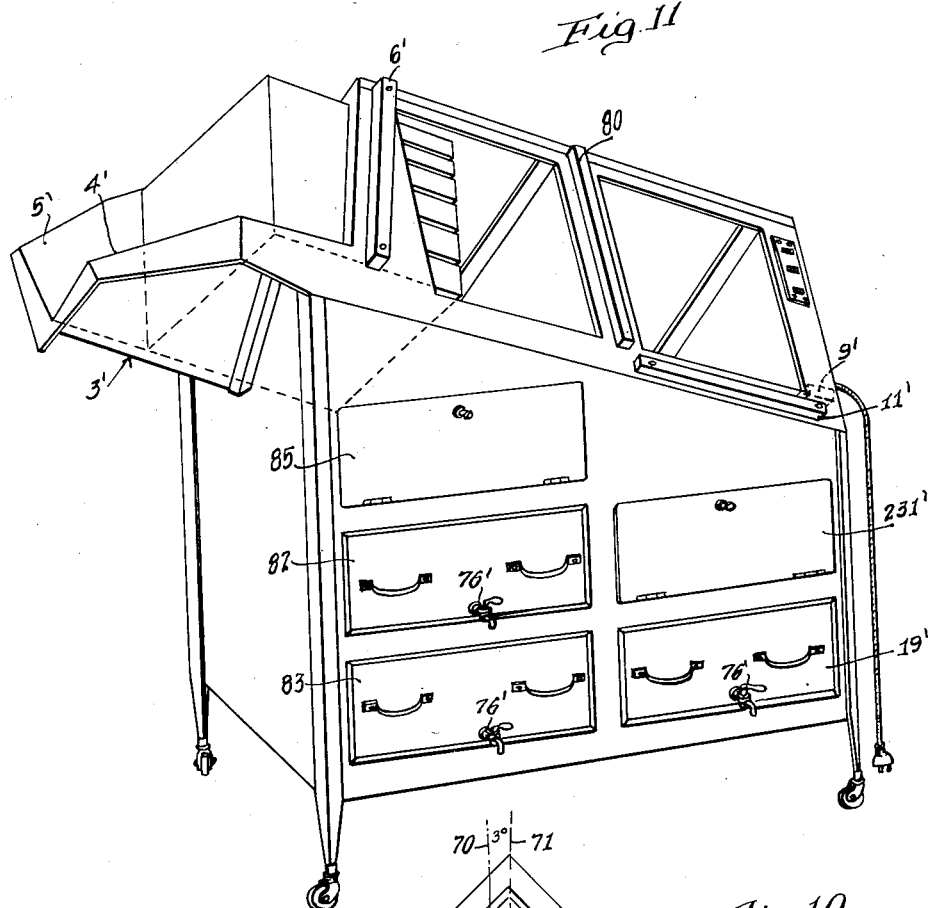
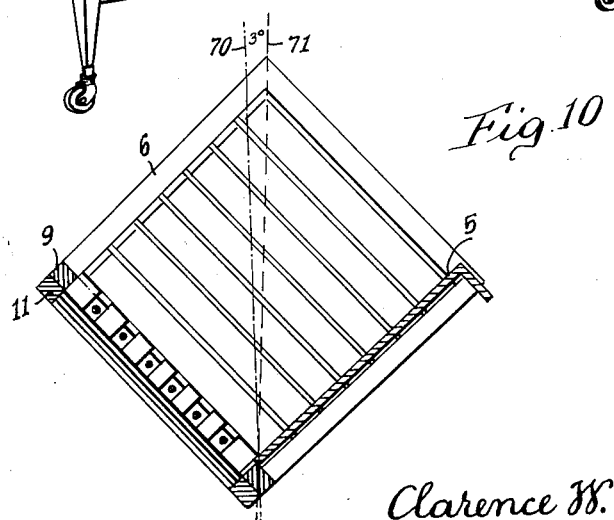
INVENTOR.
Clarence W. Ayers.
BY Lyon & Lyon
ATTORNEYS Patented May 2, 1939

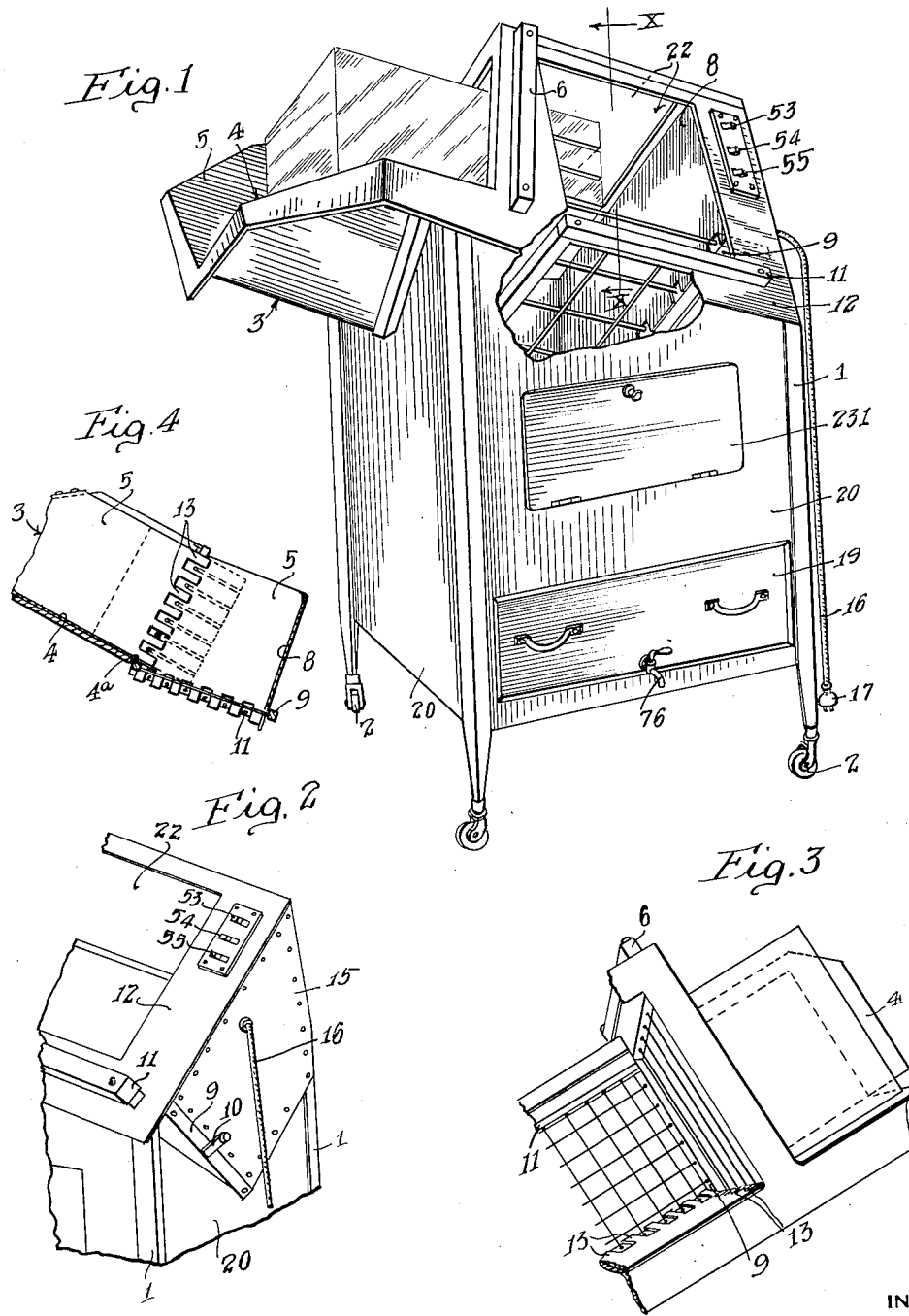

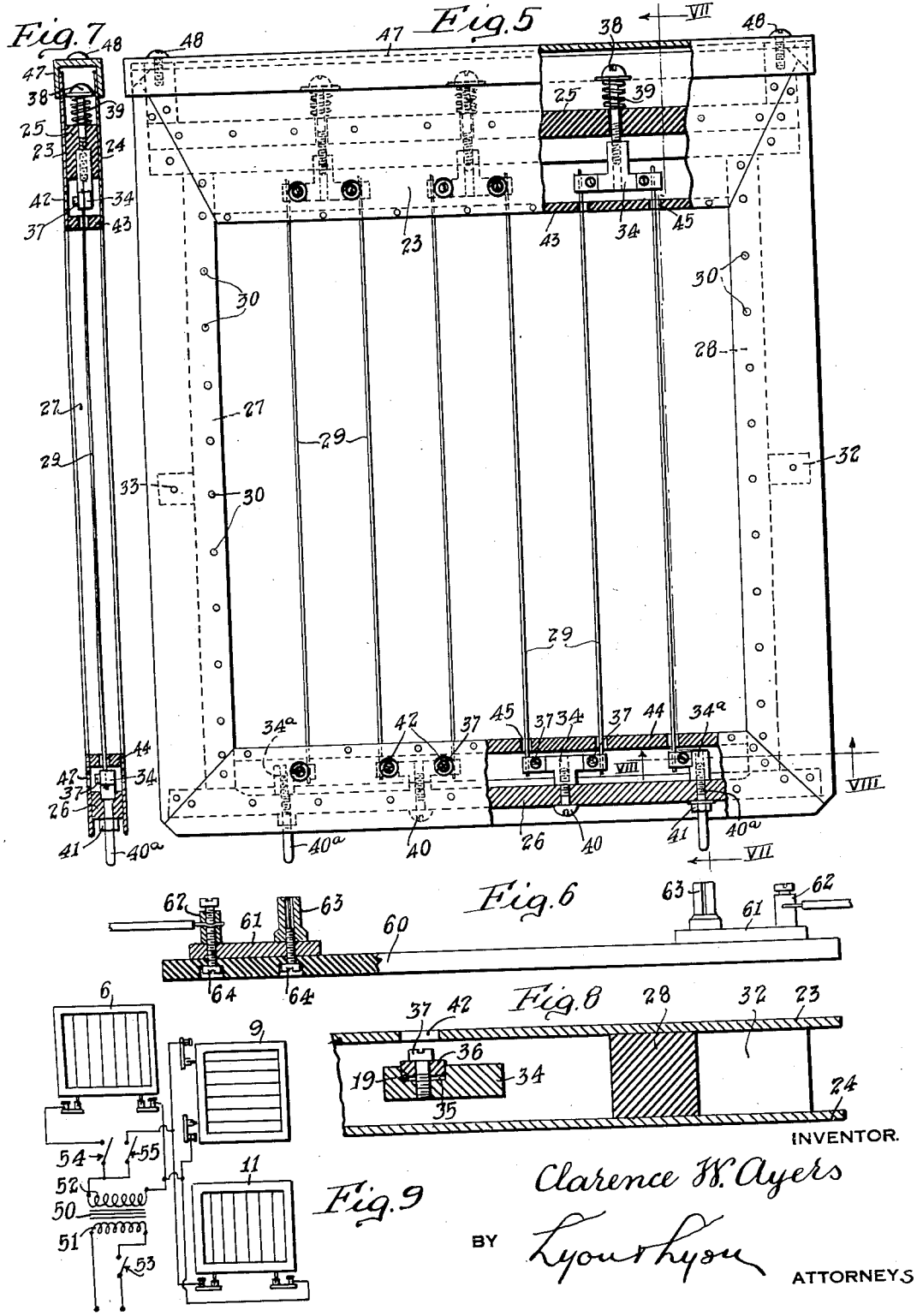

2,156,832

UNITED STATES PATENT OFFICE 2,156,832

ICE CUTTING APPARATUS

Clarence W. Ayers, Los Angeles, Calif.

Application April 20, 1936, Serial No. 75,275
Renewed January 28, 1939

14 Claims. (Cl. 219—19)

This invention relates broadly to apparatus for cutting ice and more particularly to machines for cutting large blocks of ice into cubes by means of electrically heated wires.

Machines of this type are not broadly new, the general features employed being disclosed in United States Letters Patent to Pouchan No. 1,250,010. The present invention involves refinements of the Pouchan device, which make it more practicable and useful.

An object of the invention is to provide simple and commercial practicable ice-cutting machines of the type employing electrically heated wires as the cutting elements.

Another object is to provide a machine of the type referred to which requires little attention during the operation and produces cubes of ice that are regular and uniform in shape.

A more specific object is to provide an electrically heated wire grid for an ice-cutting machine, which grid is strong and durable and may be easily repaired in case of breakage of any of the wires.

Other more specific objects and features of the invention will be apparent from the following detailed description which refers to the drawings.

In the drawings:

Fig. 1 is a perspective view of the complete ice-cutting machine in accordance with the invention;

Fig. 2 is a perspective view of a portion of the machine shown in Fig. 1 looking at the machine from a different angle;

Fig. 3 is a perspective view of a portion of the machine looking at it from still another angle;

Fig. 4 is a detail sectional view illustrating the relative positions of the ice chute and two of the grids in the machine of Fig. 1;

Fig. 5 is a face view of one the grids employed in the machine illustrated in Fig. 1, portions being broken away to better show the construction;

Fig. 6 is a view partly in section showing the construction of sockets for completing electrical connecion to the plug terminals of the grid shown in Fig. 5;

Fig. 7 is a cross section of the grid shown in Fig. 5, the section being taken in the plane VII—VII of Fig. 5;

Fig. 8 is a detail sectional view taken in the plane VIII—VIII of Fig. 5;

Fig. 9 is a schematic diagram illustrating the electrical circuit employed in the machine shown in Fig. 1;

Fig. 10 is a cross section taken in the plane X—X of Fig. 1; and

Fig. 11 is a perspective view of a modification of the machine shown in Fig. 1.

Referring first to Figs. 1, 2, 3 and 4, the ice-cubing machine therein disclosed comprises a four-cornered casing secured to and supported by four vertical frame members 1, the lower ends of which extend below the casing proper and constitute legs which may be provided with casters 2. The frame members 1 support an ice chute 3 which is inclined to feed a block of ice positioned thereby by gravity. The chute 3 comprises two walls 5 and 4, respectively, which are inclined to each other at a 90° angle and are also inclined with respect to the horizontal plane so that they constitute an inclined trough for supporting and guiding a block of ice to be cut. The walls 4 and 5 project from the main body of the machine a distance substantially equal to the width of each wall whereby the chute may receive a block of ice substantially cubical in shape. By reason of the inclination of the chute 3, a block of ice positioned therein is urged by gravity against a wire grid 6 (shown to best advantage in Fig. 5), the wires of which grid are adapted to be heated electrically so that they melt ice in contact therewith and thereby permit the cube of ice to feed through the grid. The grid 6 is removable as a unit from the machine and will be described in detail with reference to Figs. 4 and 8. It will suffice to say at this point that the grid slides into a recess provided therefor in the machine and is electrically connected through a transformer concealed within the machine to a source of energizing current.

The wall 5 of chute 3 continues beyond the grid 6 (see Fig. 3) and intersects with a wall 8 which lies substantially at right angles to the wall 5 and serves to limit movement of the ice after the latter has been cut completely into slabs by passage through the grid 6. The wall 4 of chute 3 also continues beyond the grid 6 in the same plane for a short distance, terminating in a ledge 4a which is spaced slightly above the wires of a grid 9, grid 9 being positioned substantially at right angles to the walls 5 and 8. However, the wires of grid 9 extend at a slight angle with respect to the plane of the wall 4 so that after the slabs resulting from passage of a block of ice through the grid 6 advance a relatively short distance beyond the grid 6, the lowermost slab is intercepted and supported by the wires of grid 9. This angular position of the grid 9 with respect to the wall 4 is quite important because it is impractical to so construct a grid as to permit placing the grid wires in the exact plane of the floor or wall 4. Structural details of the grid necessitate that the edges of the grid adjacent the wall 4 be positioned below the wall and if the entire grid were placed parallel to the wall 4 then the ice slabs would travel a substantial distance past the grid 6 with their advance edge unsupported, and then topple over onto the grid, imparting a severe shock to the grid members.

After the ice slabs leave the grid 6 they are completely supported by the second grid 9, the rear wall 5 and the end wall 8.

Grid 9 may be identical in construction with grid 6 and is inserted into a recess provided therefor in the machine as shown in Fig. 2. A latch 10 may be provided to retain the grid 9 in place.

Positioned immediately below the grid 9 and parallel thereto is a third grid 11 which may be identical with grids 6 and 9 but is inserted into a recess provided therefor in the machine from the upper front wall 12 as shown in Figs. 1 and 2 whereby its grid wires extend at right angles to the grid wires of grid 9.

To smoothly guide a cake of ice along the wall 5 past the grid 6, the inner surface of the upper part of wall 5 may consist of a piece of thin sheet metal liner, the inner end of which is cut away to provide fingers 13 which extend between the grid wires and guide the ice over the edges of the recess in the frame in which the grid frame supporting the grid wires is positioned. Similar plates are provided on wall 8 for guiding the ice past the recess in which the grid 9 is positioned and on the lower part of wall 5 for guiding the ice past the recess containing the third grid 11.

A suitable electrical circuit for energizing the grids 6, 9 and 11 is shown in Fig. 9. It comprises a transformer 50 having a primary winding 51 adapted to be connected by a switch 53 to any commercial source of power and having a secondary winding 52 which is adapted to be connected either to the wires of grid 6 through a switch 54 or simultaneously to the wires of grids 9 and 11 through a switch 55. These switches 53, 54 and 55 may be conventional toggle switches and may be conveniently mounted on the front wall 12 of the machine as shown in Figs. 1 and 2. The transformer 50 may be mounted within the machine between the inner end wall 8 thereof and the outer end wall 15. Connection from the primary winding of the transformer to a lighting socket may be made through a flexible cord 16 having a plug 17 on the end thereof.

In operation, a block of ice is inserted in the chute 3 and permitted to slide down the chute by its own weight until it rests against the wires of grid 6. The current is then applied to grid 6 by actuating switches 53 and 54, switch 53 closing the primary circuit to the transformer and switch 54 connecting the secondary to the terminals of the grid 6. Thereupon the wires of the grid 6 become heated and melt their way into the block of ice, the latter sliding down along the walls 4 and 5 during the process. When the block of ice has passed clear through the grid 6 it consists of a series of flat slabs resting one on top of each other, the lower slab resting upon the wires of the grid 9 and the lower edges of all the slabs resting against walls 5 and 8. Thereupon the switch 54 is opened to cut the current off of grid 6 and the switch 55 is actuated to apply current to the grids 9 and 11. The wires of these grids thereupon become heated and cut into the lower slab, the slabs settling down as the melting continues and being cut into cubes by the wires of the two grids 9 and 11. As the cubes are cut they drop into a drawer 19 from which they may be removed from time to time.

The drawer 19 may be provided with a faucet 76 for draining off water resulting from the melting action of the hot grid wires and from meltage of the finished cubes. To improve the appearance of the machine and reduce meltage of the ice cubes as they are being formed, enclosing walls 20 may be provided, these walls extending between the frame members 1 and also functioning to join these legs together. The walls may be insulated if desired although it is not essential. However, the inner walls 5 and 8 against which the ice rests are preferably spaced from the adjacent outer walls 20, thereby providing air insulation therebetween. This is particularly desirable because of the fact that the walls 5 and 8 are in direct contact with the ice. The ice chamber defined by the grids 9 and 6, the wall 8 and the portion of wall 5 beyond the grid 6 may be enclosed completely on the remaining two sides or windows 22 may be provided on those sides so that the ice can be viewed during the cutting process. An inspection door 231 may also be provided in the side wall of the machine.

The inclination of the walls 4 and 5 of the chute 3 is such that the force of gravity acting upon a piece of ice therein urges the ice with a fairly gentle pressure against the wires of grid 6, thereby preventing heavy strains being applied to those wires. Likewise the inclination of the walls 5 and 8 from vertical permits them to support a substantial part of the weight of the ice slabs, thereby reducing the force exerted by the ice on the wires of the grids 9 and 11. The inclination of the walls 5 and 8 also brings the lower end of the corner defined by those two walls to a point above the drawer 19 so that water dripping from those walls falls into the drawer 19.

It will be observed from inspection of Figs. 1 and 4 that the grid 6 is not positioned perpendicularly with respect to the path of movement of the ice. Thus although it is positioned perpendicularly to the plane of wall 5, it is inclined slightly from the perpendicular with respect to wall 4 so that if a cubical piece of ice is fed through the machine the lowermost wires of the grid 6 will cut their way through the ice before the uppermost wire does. This is advantageous for the reason that if the uppermost wire cut through the block before the lowermost wires did, the top slab might slide forwardly off the slab below it and become lodged between the end wall 8 and the ends of the other slabs. However, by advancing the end of the grid 6 that is furthest away from the wall 4, the possibility of the upper wire cutting its way through a block of ice before the lower wires do is greatly reduced.

The construction of the grids 6, 9 and 11 will now be described with reference to Figs. 5, 7 and 8. Each grid consists of a supporting frame made up of face plates 23 and 24, respectively, between which are positioned a pair of end members 25 and 26, respectively, and a pair of side members 27 and 28, respectively. The end members 25 and 26 are made of insulating material and support the wires 29 which are maintained under tension. The end members 25 and 26 are in turn supported against the stress imposed on them by the wires by the side members 27 and 28. The face plates 23 and 24 are secured to the members 25, 26, 27 and 28 by screws 30. As shown in the drawings each of the face plates 23 and 24 is made in four separate side pieces which are mitered at the corners and held in place by the screws 30 connecting them to the underlying members 25, 26, 27 and 28, respectively. To reinforce the face plates 23 and 24, the blocks 32 and 33 may be positioned therebetween on the sides, these blocks extending outwardly from the members 27 and 28, respectively.

The individual grid wires 29 are supported at opposite ends from the end frame members 25 and 26, respectively, by clamps 34 which consist of metal blocks having grooves 35 adapted to receive plates 36 which are secured to the blocks 35 by screws 37, the ends of the wires being inserted in the grooves below the blocks 36 and anchored by tightening the screws 37.

The blocks 34 adjacent to the end member 25 are attached to the latter by means of screws 38 which extend through apertures provided therefor in the frame member 25 and are threaded into the blocks 34. In order to apply spring tension to the wires 28, helical springs 39 are inserted between the frame member 25 and the heads of the screws 38. The opposite ends of the wires 29 are supported from the member 26 in exactly the same way except that the springs 39 are dispensed with and the blocks lodged firmly against the member 26 by screws 40. All of the blocks 34 shown at the top of the frame in Fig. 5 are double, that is, each block supports the ends of two adjacent wires, thereby serving the double function of mechanically supporting those two wires and also electrically interconnecting their ends.

All of the clamping members at the lower end of the frame are identical with those shown at the top of the frame except the outer two which each support only one wire and constitute terminal connections for the grid. In this instance the screws 40a are threaded only adjacent their inner ends which are threaded into the end blocks 34a and are secured to the member 26 by means of nuts 41. The outer ends of these screws are smooth, that is, they have no threads, and are adapted to be pushed into electrical sockets (Fig. 6) for completing connection from the transformer to the grid wires. It will be observed that the connecting blocks 34, which are adapted to interconnect two adjacent wires, are in staggered relation in the upper and lower ends of the frame so that all of the grid wires are connected in series between the terminal screws 40a.

Since the wires 29 are of relatively small cross section as compared to the cross sections of the elements 34 and since the wires are preferably of material such as nichrome which has a very large electrical resistance whereas the members 34 are preferably constructed of brass or copper having a very low resistance, the flow of current through the blocks 34 generates no appreciable amount of heat. This construction is much more satisfactory than that previously employed (as, for instance, that disclosed in the Pouchan patent of record), in which a single continuous grid wire was wound back and forth over insulating supports. In the latter construction the portions of the wire which passed around the supports became overheated, causing frequent breakage. Furthermore, breakage necessitated replacement of the entire grid wire. In the present construction any individual grid wire may be replaced without disturbing the rest.

To permit rapid replacement of any one of the wires 29 should it become broken from any cause, the face plate 24 is provided with apertures 42 immediately overlying the heads of the screws 37 so that the ends of the broken wire can be released by loosening the screws in the blocks at opposite ends thereof, the latter operation being accomplished by inserting a screwdriver through the adjacent openings 42. Thereafter a new wire can be inserted and the screw again tightened. Before replacing a wire it is advisable to remove the tension from the resiliently supported block which is involved, this being effected by loosening the screw 38, thereby relieving the tension of the spring 39. After a new wire has been inserted, tension can be restored by again tightening the screw 38.

The exposed edges of the side members 27 and 28 are flush with the inner edges of the face plates 23 and 24, respectively. It is also desirable to have smooth end walls flush with the edges of the plates 23 and 24 and for this reason I preferably provide insert strips 43 and 44 at opposite ends of the frame, these insert strips being removably fitted between the side members 27 and 28 at their ends. They are provided with apertures 45 through which the wires 29 pass.

All of the elements of the grid structure so far described, with the exception of the frame supporting members 25 and 26, may be constructed of metal if desired. It is sometimes advantageous, however, to make all of the frame members 23, 24, 25, 26, 27, 28, 43 and 44 of insulating material such as Bakelite, thereby reducing the possibility of short circuits in case of breakage or deformation. Constructing all the elements described of insulating material also reduces current leakage when the elements become wet. However, this leakage never becomes a serious problem because commercial ice is generally made from distilled water which is a poor conductor of electricity.

To enclose the open end of the grid and to prevent accidental contact with the screws 39, a cap 47 is provided which slips over the end of the grid frame and is secured in place by screws 48 extending into blocks 49 positioned between the face plates 23 and 24.

A particular socket construction that may be employed in connection with the grids shown in Fig. 5 is illustrated in Fig. 6. Thus it comprises a supporting bar 60 of insulating material to which are secured a pair of short buss bars 61. Each buss bar 61 is provided with a binding post 62 and a receptacle or socket 63. The binding post 62 and the socket 63 are secured to the buss bars 61 and the latter are in turn secured to the insulating supporting members 60 by screws 64 which extend upwardly through the supporting member 63 and the buss bars 61 and are threaded into the binding posts 62 and the sockets 63, respectively. The socket 63 at the opposite ends of the insulating supports 60 are so spaced from each other as to register accurately with the terminals 40a on the grids.

The electrical connections to the three grids 6, 9 and 11 have been previously described with reference to the circuit diagram of Fig. 9. It is desirable though not essential that the grids be energized by current at relatively low potential as this permits the use of wires or larger cross section (and therefore of strength to better support a heavy cake of ice) than would be permissible if standard lighting potentials were applied to the grids. By using a transformer, any desired low potential may be obtained by suitably proportioning the ratio of the turns in the primary and secondary windings of the transformer.

As previously mentioned, one advantage of the angular mounting of the walls 4, 5 and 8 and the grids 9 and 11 is that the water resulting from meltage of the ice is guided toward the center of the drawer 19 so that it can all be collected in the drawer. Another advantage of this construction is that the grids 9 and 11 are positioned over the front portion of the drawer and the drawer may be of substantial length extending clear to the rear wall of the casing. With this arrangement the drawer may be pulled out about half way to remove the cubes that have collected and the rear portion of the drawer will still be in position to collect further cubes that may have dropped from the grid 11 while the drawer is in open position.

It is also important to note that the walls 4 and 5 (and the grid 9 and wall 5) are not symmetrically positioned with respect to a perpendicular plane extending through their intersection. Instead the wall 5 is positioned slightly nearer the horizontal than are wall 4 and grid 9. Thus referring to Fig. 10 a vertical plane extended through the intersection of the wall 5 with the grid 9 is indicated at 70—70 whereas the plane bisecting the angle between the wall 5 and the plane of grid 9 is indicated by the line 71—71. As shown in Fig. 10, the angle between these two lines is approximately 3°. In practice the angle may be somewhat greater than this. The purpose of positioning wall 5 at a greater angle to the perpendicular plane 70—70 than the grid 9 is to prevent the mass of ice from tending to tip over onto the wires of grid 9. Applicant has discovered that by positioning the wall 5 and the grid 9 as described with reference to Fig. 10, the slabs feed uniformly through the grids 9 and 11 to produce symmetrical ice cubes whereas if the wall 5 is positioned at a lesser angle to the perpendicular plane 70—70 than the grid 9, the upper edges of the ice slabs remote from the wall 5 tend to feed through the grids 9 and 11 faster than the opposite edge which slides along the wall 5.

The machine illustrated in Fig. 1 is fully operative and satisfactory in use. However, it will be observed from the description of operation that while the grid 6 is operating to cut a block of ice into slabs the grids 9 and 11 are inactive. Likewise while the grids 9 and 11 are cutting the slabs into cubes the grid 6 is inactive. By modifying the machine shown in Fig. 1, as illustrated in Fig. 11, all three grids may be employed simultaneously, thereby increasing the output of the machine.

The machine shown in Fig. 11 is identical in all material respects with the machine shown in Fig. 1 except that the length of the chute 3 defined by walls 4 and 5 has been substantially increased and a stop or door 80 has been inserted adjacent the front edge of the grid 9' (all parts of the machine shown in Fig. 11 corresponding to parts of the machine shown in Fig. 1 bear the same reference numerals with the prime mark added), the grid 6' having been spaced away from the grids 9' and 11' by a distance approximately equal to the longitudinal dimensions of those grids. As shown in Fig. 11, the case of the machine has been lengthened to accommodate the increased length of the chute 3' and additional drawers 82 and 83 have been provided for storing ice cubes. However, the ice cubes as they are cut still fall into the one drawer 19' positioned therebelow exactly as in the machine of Fig. 1. An additional inspection door 85 is also provided. The door 80 is merely a slide fitting into suitable guides for supporting ice slabs that have been cut by the grid 6'. In operation a block of ice is placed in the chute 3' and the grid 6' energized. At this stage the slide 80 may or may not be in place. When the block of ice has passed through grid 6' and is cut into slabs, then the slide 80 is removed (if it had previously been inserted) to permit the slabs to move onto grid 9'. Grids 9' and 11' are then energized to cut the slabs into cubes. As soon as the first group of ice slabs is moved onto grid 9', the slide 80 may be reinserted and a new block of ice placed in the chute 3' and grid 6' energized at the same time as grids 9' and 11'. With all three grids heated the last block of ice will be cut into slabs by grid 6' about the same time that the first group of slabs is cut into cubes by the grids 9' and 11'. Thereupon the slide 80 may be removed to feed the new group of slabs onto the grid 9', after which another block of ice may be inserted in the chute 3'. It will thus be observed that with the machine shown in Fig. 11 all three grids may be employed substantially continuously to increase the output of the machine.

Various modifications may be made in the particular structure described without departing from the spirit of the invention and the invention is therefore to be limited only as set forth in the appended claims.

I claim:

1. An electrically heated ice-cutting grid comprising a frame supporting a plurality of parallel wires in a common plane, consisting of a plurality of wire clamping elements on opposite sides of said frame and insulatingly supported thereby, said clamping elements being of substantial cross section compared to the wires and of metal of good conductivity whereby they conduct heating current to the wires without themselves being heated materially thereby, each of said wire clamping elements having means for gripping the ends of two adjacent wires and conducting current between them, and the clamping elements on opposite sides of the frame being staggered relative to each other whereby they interconnect the successive wires in series with each other, and means for supplying current to the end wires in said frame.

2. A grid as described in claim 1, in which some at least of said clamping elements consist of T members with the wire gripping elements in the cross member of the T member, said frame comprising insulating members on opposite sides thereof having apertures extending therethrough for receiving the stem of the T members, and means secured to said stems and bearing against the back surfaces of said insulating members for retaining said T members.

3. An electrically heated ice-cutting grid comprising a closed frame supporting a plurality of parallel wires in a common plane, said frame comprising a pair of end members and a pair of side members connecting said end members and supporting them relative to each other, one at least of said end members comprising an inner wall and an outer wall spaced therefrom, and a pair of side walls forming with said inner and outer walls an enclosure, said inner wall having spaced openings therein for entry into said enclosure of the ends of said grid wires, supporting means within said enclosure for supporting said wires, comprising screw-clamp blocks adapted to grip the ends of said wires and complete electrical connection thereto, and means for supporting said screw-clamp blocks from said outer wall, one of said side walls having apertures therein for inserting a tool to adjust said screw-clamps, whereby the ends of said wires and said clamp blocks are mechanically and electrically protected while permitting adjustment and replacement of grid wires without disassembling the frame.

4. A grid as described in claim 3 in which said means for supporting each clamp block from said outer wall comprises a screw extending through an aperture provided therefor in said outer wall and threaded into said clamp block, with means interengaging the screw and the outer surface of said outer wall.

5. In an electrical ice-cutting machine, an inclined chute for supporting and guiding a cake of ice movable therealong, a first electrically heated grid positioned above and approximately perpendicular to said chute in the path of a cake of ice in said chute, said grid being spaced substantially ahead of the lower end of said chute whereby the ice is supported by said chute for a substantial distance after passing through said grid, and a second electrically heated grid below and at a slight angle to said chute in the path of a cake of ice leaving said chute, whereby the forward lower edge of the ice cake contacts said second grid and slides therealong without abrupt drop from said chute.

6. In an electrical ice-cutting machine, an inclined chute for feeding a cake of ice, an electrically heated grid having vertically spaced horizontal cutting wires positioned above said chute in the path of ice in the chute, said grid being slightly inclined with respect to a plane perpendicular to said chute whereby the lower wires complete their cutting operation before the uppermost wire does.

7. In an electrical ice-cutting machine, an inclined chute for supporting and guiding a cake of ice movable therealong, said chute comprising a first wall and a second wall positioned substantially at right angles to each other and intersecting to define a V-shaped trough, said second wall being shorter than said first wall and merging into an electrically heated grid constituting a continuation of said second wall, and a second electrically heated grid positioned approximately perpendicular to the walls of said chute above said first mentioned grid in the path of a cake of ice in said chute, in which the axis of said chute is positioned at an angle of less than 45° with respect to a horizontal plane and in which said first wall of said chute is angularly displaced from a vertical plane extending through the axis of the chute a greater distance than said first mentioned grid.

8. In an electrical ice-cutting machine, an inclined chute for supporting and guiding a cake of ice movable therealong, a first electrically heated grid positioned above and approximately perpendicular to said chute in the path of a cake of ice in said chute, said grid being spaced substantially ahead of the lower end of said chute whereby ice is completely supported by said chute after passing through said first grid, a second electrically heated grid beyond the lower end of and approximately in the plane of one wall of said chute in the path of a cake of ice leaving said chute, and removable stop means positioned in said chute in the path of ice therein a substantial distance below said first grid for supporting ice after complete passage thereof through said first grid.

9. In an electrical ice-cutting machine, an inclined chute for supporting and guiding a cake of ice moving therealong, a first ice-cutting grid positioned in said chute in the path of a cake of ice in said chute, said grid being spaced substantially ahead of the lower end of said chute whereby the ice is completely supported by said chute after passing through said grid, a second ice-cutting grid adjacent the lower end of said chute, and movable means engaged by the ice which has passed into the lower end of said chute, said means being operable to deliver the ice from the lower end of said chute so as to effect a removal of said ice from said chute and to deliver same to said second grid so that both said first grid and said second grid may operate simultaneously.

10. In an electrical ice-cutting machine, an inclined chute for supporting and guiding a cake of ice moving therealong, a first ice-cutting grid positioned in said chute in the path of a cake of ice in said chute, said grid being spaced substantially ahead of the lower end of said chute whereby the ice is completely supported by said chute after passing through said grid, wall means providing an ice receiving space adjacent the lower end of said chute, a second cutting grid in said ice receiving space, and movable means engaged by the ice which has passed into the lower end of said chute, said means being operable to deliver the ice from the lower end of said chute to said ice receiving space in order that said ice may pass through said second grid.

11. In an electrical ice-cutting machine: an inclined chute for supporting and guiding a cake of ice moving therealong; a first ice-cutting grid positioned on said chute in the path of ice moving therealong, said chute having a lower wall which extends beyond said first ice-cutting grid for such a distance that the ice is completely supported by said chute after passing through said grid; and a second ice-cutting grid beyond said lower wall and onto which said ice may move from the lower end of said lower wall, said ice then resting on said second ice-cutting grid and may move therethrough.

12. In an electrical ice-cutting machine: an inclined chute for supporting and guiding a cake of ice moving therealong; a first ice-cutting grid positioned on said chute in the path of ice moving therealong, said first grid having vertically spaced horizontal cutting wires and being slightly inclined from perpendicular with respect to said chute whereby the lower wires complete their cutting operation before the uppermost wire does, said chute having a lower wall which extends beyond said first ice-cutting grid for such a distance that the ice is completely supported by said chute after passing through said grid; and a second ice-cutting grid beyond said lower wall and onto which said ice may move from the lower end of said lower wall, said ice then resting on said second ice-cutting grid and may move therethrough.

13. In an electrical ice-cutting machine: an inclined chute for supporting and guiding a cake of ice moving therealong; a first ice-cutting grid positioned on said chute in the path of ice moving therealong, said chute having a lower wall which extends beyond said first ice-cutting grid for such a distance that the ice is completely supported by said chute after passing through said grid; and a second ice-cutting grid beyond said lower wall and at a slight angle thereto, said second ice-cutting grid being in the path of the ice leaving said chute whereby the forward lower edge of the ice contacts said second grid and slides therealong without abrupt drop from said chute.

14. In an electrical ice-cutting machine: an inclined chute for supporting and guiding a cake of ice moving therealong; a first ice-cutting grid positioned on said chute in the path of ice moving therealong, said first grid having vertically spaced horizontal cutting wires and being slightly inclined from perpendicular with respect to said chute whereby the lower wires complete their cutting operation before the uppermost wire does, said chute having a lower wall which extends beyond said first ice-cutting grid for such a distance that the ice is completely supported by said chute after passing through said grid; and a second ice-cutting grid beyond said lower wall and at a slight angle thereto, said second ice-cutting grid being in the path of the ice leaving said chute whereby the forward lower edge of the ice contacts said second grid and slides therealong without abrupt drop from said chute.

CLARENCE W. AYERS.